UNITED STATES PATENT OFFICE.

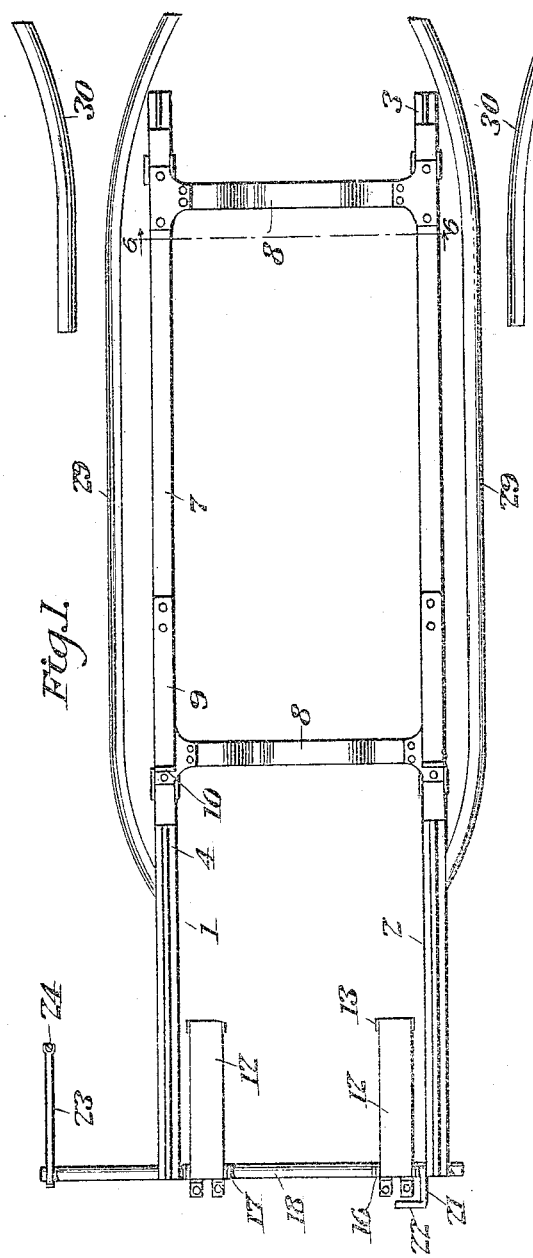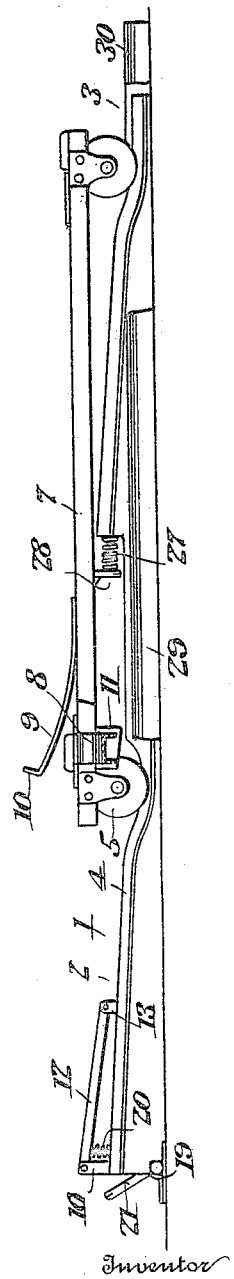

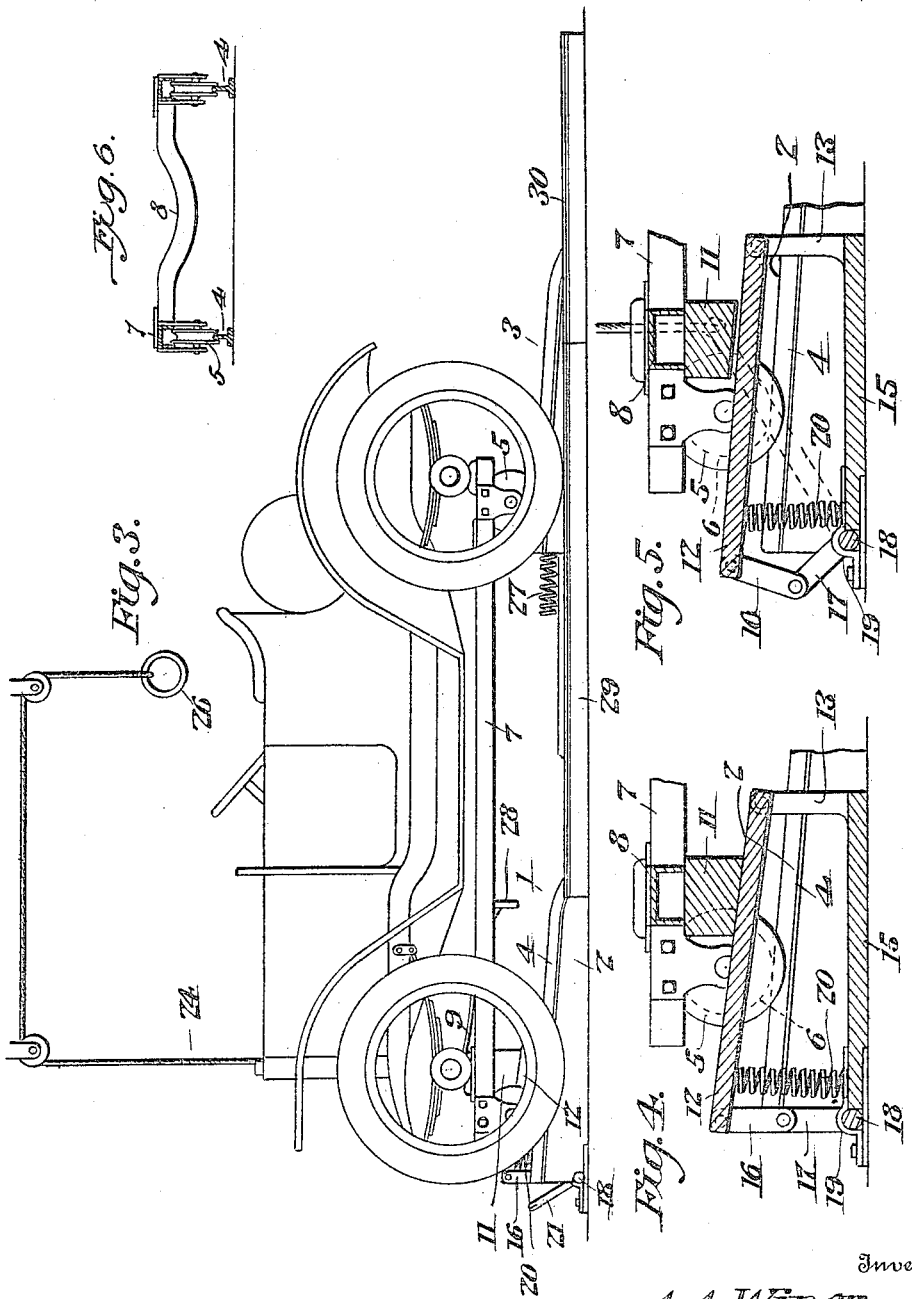

ANDREW A. WINER, OF OCALA, FLORIDA.

AUTOMOBILE RUNWAY AND LIFT.

1,225,549.  Specification of Letters Patent.  Patented May 8, 1917.

Application filed September 22, 1916. Serial No. 121,633.

*To all whom it may concern:*

Be it known that I, ANDREW A. WINER, a citizen of the United States, residing at Ocala, in the county of Marion and State of Florida, have invented new and useful Improvements in Automobile Runways and Lifts, of which the following is a specification.

This invention relates to automobile runways and lifts, the object being to simplify and improve the construction set forth in my Patent No. 1,174,922 granted March 7, 1916, whereby the mechanism is more readily manipulated, and is capable of being controlled either by the driver of the machine or by a person standing near the machine.

A further object of the invention is to provide a simplified form of truck or carriage which is adapted to automobiles of different constructions so that an automobile motor truck or the like may be propelled upon the runway and lift either in a forward or rearward direction thereby particularly adapting the apparatus for use in fire stations where the trucks are usually backed into the garage for obvious purposes.

Another object is to provide means for restoring all parts of the tripping mechanism to their initial positions after the automobile or other vehicle or truck has been released and allowed to move down the inclines, thereby automatically setting all of the parts in readiness to again receive an automobile or similar vehicle.

Another object in view is to provide buffers or cushions for arresting the movement of the truck after it has reached initial receiving position.

With the above and other objects in view, the invention consists in the novel construction, combination and arrangement of parts, as herein described, illustrated and claimed.

In the accompanying drawings:—

Figure 1 is a plan view of the automobile runway and lift of this invention, showing the truck in its receiving position.

Fig. 2 is a side elevation of the same, partly in section.

Fig. 3 is a view similar to Fig. 2 but showing the truck in its final or elevated position, together with a sufficient portion of an automobile to illustrate the position of the latter when mounted on the lift.

Fig. 4 is a fragmentary vertical longitudinal section showing one of the friction tables in its elevated or operative position.

Fig. 5 is a similar view showing one of the friction tables in its lowered position.

Fig. 6 is a cross section on the line 6—6 of Fig. 1.

Referring to the drawings 1 designates a pair of parallel members each of which is formed with a pair of inclined runways 2 and 3 located adjacent to the front and rear ends thereof and provided on their upper sides with tracks or rails 4 upon which travel the truck supporting wheels 5 having peripheries formed with grooves 6 to prevent derailment of the truck as it moves longitudinally of the runway. The rails 4 have the same inclination as the inclined portions 2 and 3 of the runway while the truck wheels 5 are arranged at such distance apart that they will start up their respective inclines at the same time and also reach the upper portion of the inclines at the same time thereby maintaining a parallelism between the truck and the floor or foundation of the garage or other structure where the automobile is housed and in which the runway and lift are placed.

The truck frame is of a generally rectangular shape comprising the longitudinal side bars 7 and the end cross bars 8 which have their center portions depressed in the form of an inverted arch so as not to interfere with such parts of the chassis of an automobile or motor truck as the differential housing, the crank case of the engine, and the fly wheel. Both of the bars 8 are formed in the same manner so as to permit an automobile to either be driven in a forward or rearward direction upon the truck. Secured to the truck and preferably to the longitudinal bars 7 thereof are spring arms 9 terminating at their free ends in stops 10 against which the axle of the automobile strikes, the result being that the truck is engaged by the automobile or other vehicle and driven along the runway until the truck wheels 5 ride upwardly on the inclined tracks or rails 4. The spring arms 9 yield downwardly under the weight of the axle and insure the engagement between the axle and the stops 10.

Located under the end portions of one of the cross bars 8 of the truck are friction shoes or blocks 11 having inclined bottom working faces as shown, and arranged in line with said shoes 11 are normally inclined friction tables 12 each of which is supported at its inner end by parallel uprights 13 fastened at their lower ends to a base 15 which may be fastened to the floor or foundation of the garage. The opposite or higher end of each friction table 12 has pivotally connected thereon links 16 the lower extremities of which are pivotally connected to short arms 17 on a horizontally disposed rock shaft 18 which may be conveniently mounted in bearings 19 fastened to the floor or foundation of the garage. Coiled springs 20 serve to yieldingly support the higher ends of the friction tables 12 and also serve to restore to their initial position, the parts by which the friction tables 12 are tripped for the purpose of releasing truck as will hereinafter appear.

The rock shaft 18 has an arm 21 projecting therefrom and having a rigid connection therewith, said arm being provided at its free extremity with an extension or pedal 22 which may be depressed by a person standing near the device for the purpose of depressing the higher ends of the friction tables. The rock shaft 18 is also provided with another lever arm 23 preferably located at one end thereof and having and attached thereto a cable 24 which runs over guide pulleys, said cable being provided at the extremity thereof with a hand grip 26 which is preferably located adjacent to the driver's seat, when the automobile or similar vehicle is in its final or elevated position. This enables the operator while seated in the automobile to give a downward pull on the hand grip 26, resulting in a turning movement of the rock shaft 18 and the depression of the higher ends of the friction tables 12, until the latter move out of engagement with the friction shoes 11 of the truck.

Extending from the forward extremities of the inclined portions 3 of the runway are buffers 27 shown for convenience in the form of coil springs. The side bars 7 of the truck frame are provided with downwardly extending projections 28 which are adapted to come in contact with the buffer springs 27 when the truck runs down the inclined tracks 4. This brings the truck to a stop while permitting the automobile to continue its progress and incidentally adds to the life and durability of the whole device. 29 designates guide rails which are located at opposite sides of the runway and have their opposite extremities deflected inwardly, the center portions of the guide rails 29 being substantially parallel and the outer faces thereon being inclined inwardly toward their top edges and located a distance apart slightly less than the distance between the oppositely located wheels of the automobile. Other guide rails 30 located at the receiving end of the device flare or diverge from the rails 29 and sufficient distance is left between the rails 29 and 30 at their nearest points to permit the wheels of the automobile to pass between them.

In operation the automobile or motor vehicle is driven in a forward or rearward direction upon the runway and lift and when the axle comes in contact with the stops 10, both of the axles are located by preference directly over the truck wheels 5. When the advance axle strikes against the stops 10, the truck is propelled by the vehicle causing the wheels 5 to ride upwardly on the inclined tracks 4 until the friction shoes 11 come in contact with the friction tables 12 which are held rigidly in an inclined position by reason of the set or position of the links 16 and the arms 17 of the rock shaft 18. This brings the truck and also the vehicle supported thereby to a stop and also prevents said truck and vehicle from moving in a reverse direction. The parts are preferably so proportioned as to hold the wheels of the vehicle an inch or more out of contact with the floor or foundation of the garage when the truck is in its elevated position. To release the truck or vehicle the rock shaft 18 is turned either by depressing the pedal 22 or pulling downwardly on the hand grip 26. This overcomes the tension of the springs 20 and lowers the friction tables sufficiently to release the friction shoes or blocks 11. Thereupon the truck or vehicle moves downwardly along the inclined rails 4, the truck being stopped by the buffers 27 and being at such time in its lowest position so that the vehicle may continue on its way without any interference between the track or vehicle. The springs 20 serve to again elevate the friction table 12 and restore the operating means thereof to their normal or initial positions. The friction shoes or tables gradually take up the momentum of the car and transfer the weight from the advance wheels of the truck to the friction tables. All four wheels of the vehicle are simultaneously raised from the floor and the truck with its load is finally sustained in a secure manner in its final position by reason of the weight imposed upon said friction shoes and tables.

What is claimed is:—

1. The combination of a runway comprising parallel members having oppositely located sets of inclined portions pitched in the same direction, a vehicle elevating truck mounted for movement longitudinally of said members and embodying truck wheels movable along the inclined portions thereof, friction shoes carried by said truck having inclined friction faces, inclined friction tables adapted to be engaged by the friction faces of said shoes and to support said shoes and the weight imposed thereon, and means for raising and lowering said friction tables comprising a rock shaft common to both tables.

2. The combination of a runway comprising parallel members having oppositely located sets of inclined portions pitched in the same direction, a truck mounted for movement longitudinally of said members and embodying truck wheels movable along the inclined portions thereof, friction shoes carried by said truck having inclined friction faces, inclined friction tables adapted to be engaged by the friction faces of said shoes and to support said shoes and the weight imposed thereon, means for raising and lowering said friction tables comprising a rock shaft common to both tables, and springs arranged under said tables and exerting an upward pressure against the same.

3. The combination of a runway comprising parallel members having oppositely located sets of inclined portions pitched in the same direction, a vehicle elevating truck mounted for movement longitudinally of said members and embodying truck wheels movable along the inclined portions thereof, friction shoes carried by said truck having inclined friction faces, inclined friction tables adapted to be engaged by the friction faces of said shoes and to support said shoes and the weight imposed thereon, means for operating said friction tables comprising a rock shaft common to both tables, arms fast on said rock shaft, links pivotally connected at one end to said arms and directly pivoted at their other ends to the tables, and means for operating said rock shaft.

4. The combination of a runway comprising parallel members having oppositely located sets of inclined portions pitched in the same direction, a truck mounted for movement longitudinally of said members and embodying truck wheels movable along the inclined portions thereof, friction shoes carried by said truck, inclined friction tables adapted to be engaged by said friction shoes and to support said shoes and the weight imposed thereon, means for operating said friction tables comprising a rock shaft common to both tables, arms on said rock shaft, pivotal links connecting said arms directly with the tables, means for operating said rock shaft, buffers on said runway members, and projections on said truck adapted to strike against said buffers in the return movement of the truck.

In testimony whereof I affix my signature.

ANDREW A. WINER.

Copies of this patent may be obtained for five cents each, by addressing the "Commissioner of Patents, Washington, D. C."